Patented Feb. 12, 1952

2,585,436

UNITED STATES PATENT OFFICE 2,585,436

PENICILLIN SALTS OF AMINES DERIVED FROM ROSIN

Lee Cannon Cheney, Fayetteville, N. Y., assignor to Bristol Laboratories Inc., New York, N. Y., a corporation of New York No Drawing. Application January 15, 1951, Serial No. 206,121

2 Claims. (Cl. 260—100)

This invention relates to penicillin salts of primary amines derived from rosin. More particularly, it relates to penicillin G salts prepared from commercially available modified rosin amines which have been shown by Borglin, Soap Sanit. Chemicals, 23, No. 12, 147, 149, 167 (1947) (Chemical Abstracts, 43, 9378 (1949)), to be effective bactericides and fungicides. The principal components of these rosin amides have been shown to be dehydroabietylamine (I) dihydroabietylamine (II) and tetrahydroabietylamine (III).

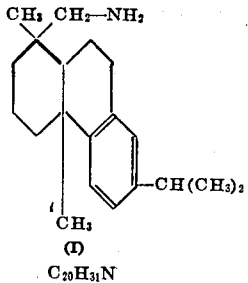

(I)
$C_{20}H_{31}N$

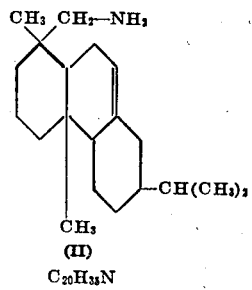

(II)
$C_{20}H_{33}N$

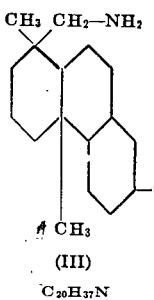

(III)
$C_{20}H_{37}N$

An object of the invention is to produce low-cost, relatively stable, nontoxic, water-insoluble salts of penicillin which combine the notable antibiotic properties of the penicillins with the marked antibacterial and antifungal properties of the primary amines derived from the abietic acid moiety of rosin. These salts are particularly valuable for the introduction of a stable form of penicillin into therapeutic compositions, such as tablets for oral administration, antiseptic tooth powders, tooth pastes, and ointments, powders and impregnated bandages useful for the topical treatment of infections or the protection of wounds. Moreover these cheap, nontoxic penicillin salts are valuable for the preparation of products useful in veterinary medicine and for incorporation of a stable form of penicillin into poultry and livestock feeds.

Outstanding advantages of the salts of this invention over the numerous other amine salts of penicillin which have been described are (a) the comparatively very low cost of the rosin amines, (b) the marked inherent antibacterial and antifungal properties of the rosin amines, (c) the remarkably low toxicity toward animals exhibited by the rosin amines and (d) the very low water solubility of the rosin amine salts of penicillin, a property which accounts for their remarkable stability in the presence of moisture. For example, at room temperature the solubility of the penicillin salt of "Rosin Amine D" in water is 300 to 400 units (International Units) per ml.: the comparable solubility of the penicillin G salt of "Rosin Amine S" is approximately 84 units per ml. In contrast at room temperature the solubility of the procaine salt of penicillin G in water is 5500–6000 units per ml.

The amines described in this invention can be prepared by converting abietic acid into the corresponding disproportionated nitriles by means of ammonia at elevated temperatures by known methods applied to the higher moleculuar-weight fatty amines (Ralston et al., Journal of the American Chemical Society, vol. 59, p. 986 (1937)) followed by reduction of the nitriles catalytically or with sodium and alcohol by the method of Harwood, U. S. Patent 2,122,644 (1938).

Because of its commercial availability the composition of amines which I prefer to use in the invention is "Rosin Amine D" manufactured by Hercules Powder Company, Wilmington, Delaware. "Rosin Amine D" consists of approximately 50% (I), 20% (II) and 20% (III), the remainder comprising neutral materials of rosin. However, other ratios of these three amines operate satisfactorily in the invention. For example, "Rosin Amine S," which has an amine composition of approximately 5% (I), 20% (II), and 70–75% (III), readily forms a crystalline, water-insoluble salt with penicillin G.

The amine salts of the invention can be prepared by treatment of an aqueous solution of an alkali salt of penicillin with an appreciably soluble organic or inorganic salt of rosin amine. For example, the acetate and hydrochloride, which are both moderately soluble in water, are particularly desirable for the preparation of the corresponding amine salts of penicillin. An alternative method consists in the treatment of water-immiscible organic solvent extract of penicillin free acid with a moderate excess of a rosin amine dissolved in a water-immiscible organic solvent. Suitable inert organic solvents which may be used in the process include ethyl ester, methylene, dichloride, ethylene dichloride, chloroform, butanol, methyl isobutyl ketone, tributyl phosphate, n-butanol and amyl acetate.

Example I

To a suspension of 148.8 g. (0.40 mole) of crude potassium benzylpenicillinate in 1 liter of ice-cold ether contained in a separatory funnel was added 740 ml. of an ice-cold solution of 8.5% phosphoric acid in three portions accompanied by vigorous shaking of the funnel after each addition. The aqueous layer (pH 2) was separated and discarded; the brown ether layer was filtered to remove insoluble material, cooled in an ice-salt bath and treated with an ice-cold solution of 139.6 g. (0.44 mole) of "Rosin Amine D" (91% amine content obtained from Hercules Powder Company) in 800 ml. of ether. One liter of ether was added; the suspension of the amine salt was stirred thoroughly and then filtered. The resulting cake was broken up, slurried with ether and dried over phosphorus pentoxide to obtain 233.2 g. (93.6% yield) of pale yellow microcrystalline salt of "Rosin Amine D" and benzylpenicillin, M. P. 140–150° C. (decompn.) with previous sintering about 137° C. The ether is recovered and reused in the process.

Example II

To a cold suspension of 37.2 g. (0.1 mole) of crude potassium penicillin (89% penicillin G) in 1 liter of ether contained in a separatory funnel was added 185 ml. of ice-cold phosphoric acid solution (8.5% phosphoric acid) in three portions, shaking the funnel after each addition. The aqueous layer was approximately pH 2. The ether layer containing the penicillin free acid was filtered, cooled in a ice-salt bath and treated with a cold solution of 34.9 g. (0.11 mole) of "Rosin Amine D" in 800 ml. of ether. The salt, which precipitated at once, was collected by suction and dried over phosphorus pentoxide to obtain 55.8 g. (a 94% yield based on unit potency) of a cream colored product, M. P. 137.5–144.5° C. (decompn.) the major portion melting over the range 140–144.5° C.

Inasmuch as the calculated molecular formula for "Rosin Amine D" based on the percentage composition of the amines present is approximately $C_{20}H_{33}N$, the molecular formula of the salt is approximately $S_{36}H_{51}N_3O_4S$ with a molecular weight of 621.85; hemihydrate, 630.86.

Anal. Calcd. for $(C_{36}H_{51}N_3O_4S)_2H_2O$: C, 68.55; H, 8.30; $H_2O$, 1.42. Found: C, 68.4; H, 8.43; $H_2O$, 1.37.

*Microbiological assay.*— One hundred milligrams of the pulverized salt was dissolved in exactly 100 ml. of reagent acetone in a volumetric flask. One milliliter of this solution was introduced into a mixture of 10 ml. of phosphate buffer (pH 6.5–7.0) and 500 ml. of distilled water contained in one-liter volumetric flask. The mixture was diluted to exactly one liter with distilled water, shaken well, and a sample was subjected to the standard penicillin assay, using *Staph. aureus* as the test organism. Theoretical potency: 942 International Units per mg. Reported potency: 0.964 International Units per ml. of solution or 964 International Units per mg.

*Solubility.*—The solubility of the salt in water at 25° C. is only 300–400 International Units per ml. It is very soluble in methanol, fairly soluble in methylene dichloride and chloroform and practically insoluble in amyl acetate and ether.

Example III

To a solution of 2 g. of "Rosin Amine S" (a mixture consisting of approximately 70–75% tetrahydro-, 20% dihydro-, and 5% dehydroabietylamine supplied by Hercules Powder Company) in 20 ml. of ether there was added an ether solution of benzylpenicillinic acid prepared by treating 2.2 g. of potassium benzylpencillinate dissolved in 10 ml. of water and layered with 30 ml. of ether contained in a separatory funnel with dilute phosphoric acid until the aqueous phase of the well shaken system had reached pH 2.12 and by drying the separated ether layer for a fifteen minute period over anhydrous sodium sulfate and then filtering to remove the inorganic salt. A solid salt formed immediately which was suspended in additional ether to facilitate filtration. The cream-colored Rosin Amine S benzylpenicillin salt, after being dried in vacuo over silica gel was found to have a potency of 664 International Units per mg. when tested against *Staph. aureus* under the conditions of the standard penicillin assay. A saturated solution of the salt in water at 25° C. assayed 84 International Units per ml.

Example IV

To a suspension of 51 g. of "Rosin Amine D" (from Hercules Powder Co.) in 350 ml. of ether was added 10.6 ml. of glacial acetic acid while stirring the mixture. Solution was complete in about fifteen minutes. This solution was added to 53 g. of sodium penicillin G dissolved in 700 ml. of distilled water, and the stirred mixture was allowed to stand overnight at 5–10° C. The precipitated salt was collected by suction filtration and washed on the filter with 50 ml. of distilled water. Additional salt precipitated when an excess of "Rosin Amine D" acetate in aqueous solution was added to the combined filtrate and washings. This fraction was also collected by suction and washed thoroughly with distilled water. The combined fractions of penicillin salt were dried in vacuo over silica gel to constant weight of 89.3 g. Microbiological assay against *Staph. aureus*: A 1 mg. per ml. sample of the dry salt in 80% acetone assayed 846 International Units per mg.

While the present invention has been described with particular reference to the "Rosin Amine D" and "Rosin Amine S" salts of benzylpenicillin it will be understood that "Rosin Amine" salts of other penicillins are also included within the scope of this invention. For instance, the natural penicillins such as penicillin G, F, X dihydro F and K and mixtures of two or more such penicillins, particularly such mixtures containing at least 85% benzylpenicillin (penicillin G), are included within the scope of this invention.

It will be understood that, without departing from the spirit of the invention or the scope of the claims, various modifications may be made in the specific expedients described as these are illustrative only.

I claim:
1. A salt of penicillin and a member of the group consisting of dehydroabietylamine, dihydroabietylamine, and tetrahydroabietylamine.
2. A salt of penicillin and dehydroabietylamine.

LEE CANNON CHENEY.

No references cited.